(12) United States Patent
Shinjo et al.

(10) Patent No.: US 6,200,434 B1
(45) Date of Patent: Mar. 13, 2001

(54) APPARATUS FOR PRODUCING ELECTROLYTIC WATER

(75) Inventors: Takao Shinjo; Hiroyuki Tsuchiya, both of Yokohama (JP)

(73) Assignee: Amano Corporation, Kanagawa-ken (JP)

( * ) Notice: Subject to any disclaimer, the term of this patent is extended or adjusted under 35 U.S.C. 154(b) by 0 days.

(21) Appl. No.: 09/257,283

(22) Filed: Feb. 25, 1999

(30) Foreign Application Priority Data

Feb. 27, 1998 (JP) .................................................... 10-64351
Mar. 6, 1998 (JP) .................................................... 10-73324

(51) Int. Cl.$^7$ .............................. C25B 15/00; C25B 9/00
(52) U.S. Cl. ................................ 204/230.2; 204/230.6; 204/263
(58) Field of Search ............................... 204/263, 228.3, 204/230.2, 230.6

(56) References Cited

U.S. PATENT DOCUMENTS 5,234,563 * 8/1993 Arai et al. ......................... 204/228.3
5,965,009 * 10/1999 Shimamune et al. ............. 204/263 X
5,985,108 * 11/1999 Arai ................................... 204/230.6 X
5,997,717 * 12/1999 Miyashita et al. ................ 204/263 X

* cited by examiner

Primary Examiner—Donald R. Valentine
(74) Attorney, Agent, or Firm—Stevens, Davis, Miller & Mosher, L.L.P.

(57) ABSTRACT

An apparatus for producing an electrolytic water including an electrolyzing vessel which is partitioned into an anode chamber and a cathode chamber by a partition membrane, electric current being supplied to electrodes set in the anode and cathode chambers and water to be electrolyzed being delivered into the anode and cathode chambers to produce anodic water in the anode chamber and cathodic water in the cathode chamber, electrolytic water thus produced being discharged through discharge ports disposed on the anode and cathode chambers, wherein the anode chamber is connected with anode side treating water supply means which is capable of supplying, as treating water, sodium chloride solution or potassium chloride solution to the anode chamber and which is capable of adjusting quantities of supply thereof, and the cathode chamber is connected with cathode side treating water supply means which is capable of supplying, as treating water, hydrochloride solution or dilute hydrochloride solution to the cathode chamber. Advantages of the apparatus not only that a required quantity of electrolytic production water can be produced by a single apparatus upon demand, but that the electrolytic production water has a stable electrolysis, a effective concentration, and the desired pH.

10 Claims, 11 Drawing Sheets

RELATION BETWEEN TOTAL AMOUNT OF HYDROCHLORIDE AND STROKES

RELATION BETWEEN AMOUNT OF PRODUCTION AND STROKES

CONDITIONS OF MEASUREMENT

CURRENT VALUE 30A
ELECTROLYTIC SOLUTION : SALT SOLUTION 26%
: HYDROCHLORIDE SOLUTION 1N (1mol/L)
CURRENT DENSITY : 43A/dm$^2$

APPARATUS FOR PRODUCING ELECTROLYTIC WATER

BACKGROUND OF THE INVENTION

This invention belongs to a technical field of an apparatus for producing an electrolytic water wherein the apparatus is capable of producing an acidic water and an alkaline water by electrolyzing a service water or the like. The invention particularly relates to an apparatus for producing an electrolytic water wherein the apparatus is capable of producing an electrolytic production water having a desired pH and effective hydrochloride concentration in accordance with necessity.

An electrolytic production water obtained by electrolyzing an aqueous solution (for example, a salt solution) as a water to be electrolyzed (hereinafter simply referred to as the "treating water") is effective as a water for sterilizing bacteria. It is said that in a sterilizing mechanism, bacteria are sterilized chiefly by effective chlorine, such as hypochlorous acid contained in the electrolytic production water. The electrolytic production water is different in sterilizing effect depending on pH. By decreasing pH, the sterilizing power can be increased. However, since the effective chlorine is readily evaporated and the effective sterilizing time is comparatively short, inconveniences are encountered in use. On the other hand, a neutral water is inferior in sterilizing power relative to the acidic water but it has a superior water retentive property. Therefore, the neutral water is sometimes much in demand depending upon a particular use.

Several approaches have been made. For example, Japanese Patent Examined Publication (Kokoku) No. Hei 4-42077 and Japanese Patent Unexamined Publication (Kokai) No. Hei 50237478 (Pat. No. 2619756) disclose an apparatus for producing a sterilizing water and a method for producing a sterilizing water.

The former Publication discloses an apparatus for producing an electrolytic water, in which a treating water obtained by mixing a sodium chloride with a raw water is poured into an electrolysis vessel whose interior is partitioned into an anode chamber and a cathode chamber by a partition membrane and electrolyzed to produce an acidic water in the anode chamber and an alkaline water in the cathode chamber, and the acidic water produced within the anode chamber is dilute mixed with a raw water or the alkaline water produced within the cathode chamber to thereby obtain an electrolytic production water (sterilizing water) having a proper pH and a proper effective chlorine concentration and at the same time, to thereby increase a quantity of such sterilizing water to be supplied.

The latter Publication discloses a method for producing a sterilizing water of pH 3 to 7, in which method, a water added with a sodium chloride is mixed with a water added with a hydrochloride, and a resultant mixed solution is electrolyzed, as a treating water, in an electrolysis vessel having no partition membrane.

However, in the conventional apparatus for producing an electrolytic production water disclosed in the former Publication, it is difficult to obtain an intended quality of water because of a relation between the setting pH and chlorine concentration when the quantity of production water is greatly changed.

Also, a production capacity of the apparatus for producing an electrolytic production water, disclosed in the former Publication is preliminarily established by power source, etc. and a quantity of electrolytic production water having a predetermined effective chlorine concentration, which can be produced in a predetermined time, is naturally limited. For this reason, an apparatus having a capacity suited for producing a quantity of water used by a user is used in an ordinary case. However, the quantity of water to be used is not constant. In case the quantity of electrolytic production water to be supplied is short, it is necessary to preliminarily produce a larger quantity of electrolytic production water than necessary and store the water in a tank or the like, or it is necessary to install a separate apparatus to offset the shortage. This kind of adjustment work is very troublesome and economically inefficient.

In addition, the alkaline water produced in the cathode chamber is unnecessary for the user who needs only acidic water and therefore, such alkaline water is eventually wastefully discarded. Moreover, there is involved such a problem that electrolytic reaction is changed depending on the state of raw water (quality of raw water) and as a result, pH and the effective chlorine concentration tend to be varied.

Also, in the method for producing a sterilizing water disclosed in the latter Publication, the treating water uses salt and hydrochloride as electrolyte, whereby a hypochlorous acid is produced and at the same time, pH is adjusted by hydrochloride. Although this approach avoids wastefully discarding the produced alkaline water unlike in the apparatus disclosed in the former Publication, it is still necessary to perform such a troublesome adjustment work for adjusting the setting pH and effective chlorine concentration when the quantity of water to be produced is to be changed.

In addition, in the method for producing a sterilizing water disclosed in the latter Publication, the chlorine chiefly acts as an adjustment agent for pH but at the same time, it also supplies its own chloride ion. As a consequence, hypochlorous acid is also undesirably produced. This makes it unable to control pH and the concentration of hypochlorous acid separately.

SUMMARY OF THE INVENTION

It is, therefore, an object of the present invention to provide an apparatus for producing an electrolytic water, in which the pH and the concentration of effective chlorine of an electrolytic production water can be controlled separately and an electrolytic sterilizing water having a required pH and concentration of effective chlorine can be produced in accordance with necessity.

It is another object of the present invention to provide an apparatus for producing an electrolytic water, in which a production quantity can easily be adjusted in accordance with necessity, using only a single apparatus.

In order to achieve the above objects, the present invention provides the following means.

An apparatus for producing an electrolytic water includes an electrolyzing vessel which is partitioned into an anode chamber and a cathode chamber by a partition membrane, electric current being supplied to electrodes set in the anode and cathode chambers and water to be electrolyzed being delivered into the anode and cathode chambers to produce anodic water in the anode chamber and cathodic water in the cathode chamber, electrolytic water thus produced being discharged through discharge ports disposed on the anode and cathode chambers, wherein:

(1) the anode chamber is connected with anode side treating water supply means which is capable of supplying, as treating water, sodium chloride solution or potassium chloride solution to the anode chamber and which is capable of adjusting quantities of supply thereof, and the cathode chamber is connected with cathode side treating water supply means which is capable of supplying, as treating water, hydrochloride solution or dilute hydrochloride solution to the cathode chamber, (2) the apparatus further comprises electrolytic water producing/mixing means capable of mixing, at a desired ratio, anodic water produced in the anode chamber and discharged therefrom with cathodic water produced in the cathode chamber and discharged therefrom, to obtain mixed water, (3) the apparatus further comprises dilute mixing means capable of mixing, at a desired ratio, anodic water produced in the anode chamber, cathodic water produced in the cathode chamber, or mixed water thereof with raw water such as service water or the like, to obtain mixed water, (4) a pump is used as the anode side and cathode side treating water supplying means, a raw water supply passage for supplying service water or the like is provided with a flow meter for detecting a flow quantity, and each pump on the anode side or cathode side is controlled for operation in accordance with the flow quantity of raw water measured by the flow meter, so that a required quantity of produced anodic water, cathodic water, or mixed water thereof can be mixed with the raw water, (5) the apparatus further comprises solution-to-be-electrolyzed used/remaining quantity arithmetic calculation means capable of calculating and outputting a remaining quantity of a used quantity, and a remaining quantity of solution-to-be-electrolyzed which remaining quantity is obtained by calculation based thereon, in accordance with an integrated flow quantity of raw water measured by the flow meter, (6) the anode chamber is connected with anode side treating water supply means which is capable of supplying, as treating water, sodium chloride solution or potassium chloride solution to the anode chamber, the cathode chamber is connected with cathode side treating water supply means which is capable of supplying, as treating water, hydrochloride solution or dilute hydrochloride solution to the cathode chamber, and wherein the apparatus for producing an electrolytic water further comprises electrolytic current control means for controlling supply quantities of electric current with respect to the electrodes of the anodic and cathodic chambers such that in case a supply quantity of the treating water with respect to the anode chamber is to be increased, the supply quantity of the electric current is increased in proportion to increase of the supply quantity of the treating water, and in case a supply quantity of the treating water with respect to the anode chamber is to be decreased, the supply quantity of the electric current is decreased in proportion to decrease of the supply quantity of the treating water, (7) the anode chamber is connected with anode side treating water supply means which is capable of supplying, as treating water, sodium chloride solution or potassium chloride solution to the anode chamber, the cathode chamber is connected with cathode side treating water supply means which is capable of supplying, as treating water, hydrochloride solution or dilute hydrochloride solution to the cathode chamber, and pulse current for making ON/OFF duty variable is supplied to the electrodes of the anode and cathode chambers, and wherein the apparatus for producing an electrolytic water further comprises electrolytic current control means for controlling the ON/OFF duty ratio such that in case a supply quantity of the treating water with respect to the anode chamber is to be increased, the ON-time duty ratio is increased in proportion to increase of the supply quantity of the treating water, and in case a supply quantity of the treating water with respect to the anode chamber is to be decreased, the ON-time duty ratio is decreased in proportion to decrease of the supply quantity of the treating water, (8) a quantity of the treating water, supplied by the cathode side treating water supply means can be adjusted independently from the anode side, (9) a pump is used as the anode side and cathode side treating water supply means, a raw water supply passage for supplying service water or the like is provided with a flow meter for detecting a flow quantity, and each pump on the anode side or cathode side is controlled for operation in accordance with the flow quantity of raw water measured by the flow meter, so that a required quantity of produced anodic water, cathodic water, or mixed water thereof can be mixed with the raw water, and

(10) the apparatus further comprises storage means for storing, when a predetermined flow quantity of electrolytic production water having various effective hydrochloride concentration is to be produced, data related to a quantity of treating water supplied to the cathode chamber side and a pH value which the resultant electrolytic production water shows, and cathode chamber side supply quantity control means for determining a supply quantity of treating water with respect to the cathode chamber based on various pH values which are set based on the related data stored in the storage means and a flow value which is obtained based on a relation between the quantity of treating water to be supplied to the cathode chamber side for each effective hydrochloride concentration, and controlling the cathode side treating water supply means based on the supply quantity thus determined, so that a constant quantity of treating water is supplied.

According to the means of the above item (1), it is possible to produce an anodic water within the anode chamber and a cathodic water within the cathode chamber by supplying a sodium chloride solution or a potassium chloride solution having a constant concentration to the anode chamber and supplying a hydrochloride solution or a dilute hydrochloride solution having a constant concentration to the cathode chamber. Also, by adjusting the quantities of treating water to be supplied to the anode chamber and the cathode chamber, the quantities of anodic water and cathodic water to be produced in the anode chamber and in the cathode chamber can easily be adjusted. Moreover, the pH and the concentration of effective chlorine can be controlled separately. Accordingly, required quantities of anodic water and cathodic water having required pH and concentration of effective chlorine can easily be produced.

According to the means of the above item (2), since the pH, concentration of effective chlorine and the quantities of production of the anodic water and the cathodic water produced in the anode chamber and in the cathode chamber can easily be controlled, an electrolytic production water (i.e., a sterilizing water) having a desired pH and a desired concentration of effective chlorine can easily be produced by mixing them. Accordingly, a production quantity can easily be adjusted in accordance with necessity, using a single apparatus. Moreover, a relation between the setting pH and concentration of effective chlorine can be maintained even if the production quantity is greatly changed. This makes it possible to obtain an intended quality of water.

Also, in case the pH of the electrolytic production water produced in the cathode chamber is made from a neutral to an acidic region, the alkaline water, which is conventionally wastefully discarded, can be utilized as it is. Accordingly, the alkaline water once produced is not wastefully discarded. In case the cathode chamber side is to be adjusted to an acidic region, the attachment of a scale to the cathode electrode can be prevented. Accordingly, the labor required for reversedly washing the electrode can be eliminated.

According to the means of the above item (3), since the anodic water or the cathodic water produced in the anode chamber or in the cathode chamber can be dilute mixed with a raw water such as a service water or the like, a diluting power can greatly be increased. Accordingly, a required quantity of electrolytic production water having a required quality can easily be produced. Moreover, since a raw water is not supplied directly to the electrolysis vessel, the quantity to be electrolyzed is small and the temperature is easily raised. Accordingly, electrolyzing efficiency can easily be enhanced.

According to the means of the above item (4), by controllably actuating the pumps for the anode chamber and the cathode chamber, the production quantities of anodic water and cathodic water can easily be controlled and in addition, the mixing quantities of anodic water and cathodic water with respect to a raw water can easily be controlled. Accordingly, it is no longer required to preliminarily store such electrolytic production water which will be required later. This makes it possible to produce a required quantity of electrolytic production water (sterilizing water) having a required quality only when it is required.

According to the means of the above item (5), the anodic water and the cathodic water are mixed with each other at a constant ratio in conformity with the flow quantity of raw water. Accordingly, a quantity of the treating electrolyte (treating water) to be used can be calculated based on the integrated flow quantity of raw material. This makes it easy to perform a maintenance such as timing for supplementing the treating electrolyte. Moreover, it is no longer required, unlike in the conventional art, to adjust the additive such as the electrolyte and to control the electric currency by measuring the produced electrolytic water using various sensors such as pH meter, etc. Simply by adding a quantity of electrolyte matched with the quantity of water after measuring a flow quantity of raw water, an electrolytic production water having a required quality can easily be produced.

According to the means of the above item (6), it is possible to produce an anodic water in the anode chamber and a cathodic water in the cathode chamber by supplying a sodium chloride solution or a potassium chloride solution having a constant concentration to the anode chamber, and supplying a hydrochloride solution or a dilute hydrochloride solution having a constant concentration to the cathode chamber. For such electrolysis, since it is controlled that the quantity of electricity to be supplied to the electrodes is comparatively increased in accordance with an increase/decrease of the quantity of treating electrolytic water to be supplied to the anode chamber, there can be produced an electrolytic production water having a constant concentration of effective chlorine as preset, irrespective of the quantity of the electrolytic production water (anodic water) discharged from the anode chamber. Also, by changing the setting, a production water having a chlorine of a predetermined concentration can be produced. This makes it possible to produce a required quantity of electrolytic production water having a required concentration of effective chlorine.

According to the means of the above item (7), for electrolysis, the ON/OFF time for the pulse current to be supplied to the electrodes is changed in accordance with the increase/decrease of the quantity of treating water to be supplied to the anode chamber. That is, it is controlled such that in case the treating water is increased, the ON-time is increased but in case the treating water is decreased, the ON-time is decreased. Accordingly, there can be produced an electrolytic production water having a constant concentration of effective chlorine as preset, irrespective of the quantity of electrolytic production water discharged from the anode chamber. Also, by changing the setting, there can be produced a production water having chlorine of a predetermined concentration. This makes it possible to easily produce a required quantity of electrolytic production water having a required concentration of effective chlorine. Moreover, since it is controlled by short ON/OFF of the pulse, there can be produced a uniform electrolytic water in such a short interval of time.

According to the means of the above item (8), the quantity of treating water to be supplied to the cathode chamber can independently be changed irrespective of the quantity of treating water to be supplied to the anode chamber, electrolytic conditions, etc. Accordingly, since the concentration of effective chlorine is controlled in the anode chamber side to produce a predetermined quantity and pH can chiefly be controlled in the cathode chamber side, there can be produced electrolytic production water having a desired concentration of effective chlorine and having a desired pH in the anode chamber and in the cathode chamber.

According to the means of the above item (9), by controllably actuating the pumps for the anode chamber and the cathode chamber, the production quantities of anodic water and cathodic water can appropriately be controlled and the quantities of anodic water and cathodic water to be mixed with a raw water can appropriately be controlled. Moreover, the quantity of electricity to be supplied to the anodic electrode and the cathodic electrode can appropriately be controlled in accordance with the change of the flow quantity of raw water. By doing so, there can be produced an electrolytic production water which has a proper concentration of effective chlorine and which is diluted to have a proper pH. Accordingly, it is no longer required to preliminarily store a required quantity of electrolytic production water. This makes it possible to produce only a required quantity of electrolytic production water (sterilizing water) having a required quality only when it is required.

According to the means of the above item (10), since the related data of the supply quantities (adding quantities) of treating water (hydrochloride or dilute hydrochloride) with respect to the cathode chamber and the production quantities thereof for various concentrations of effective chlorine and pH values, there can easily produce only a required quantity of electrolytic production water having a required quality merely by designating the concentration of effective chlorine and the pH value.

DETAILED DESCRIPTION OF THE EMBODIMENT

Figure 1:
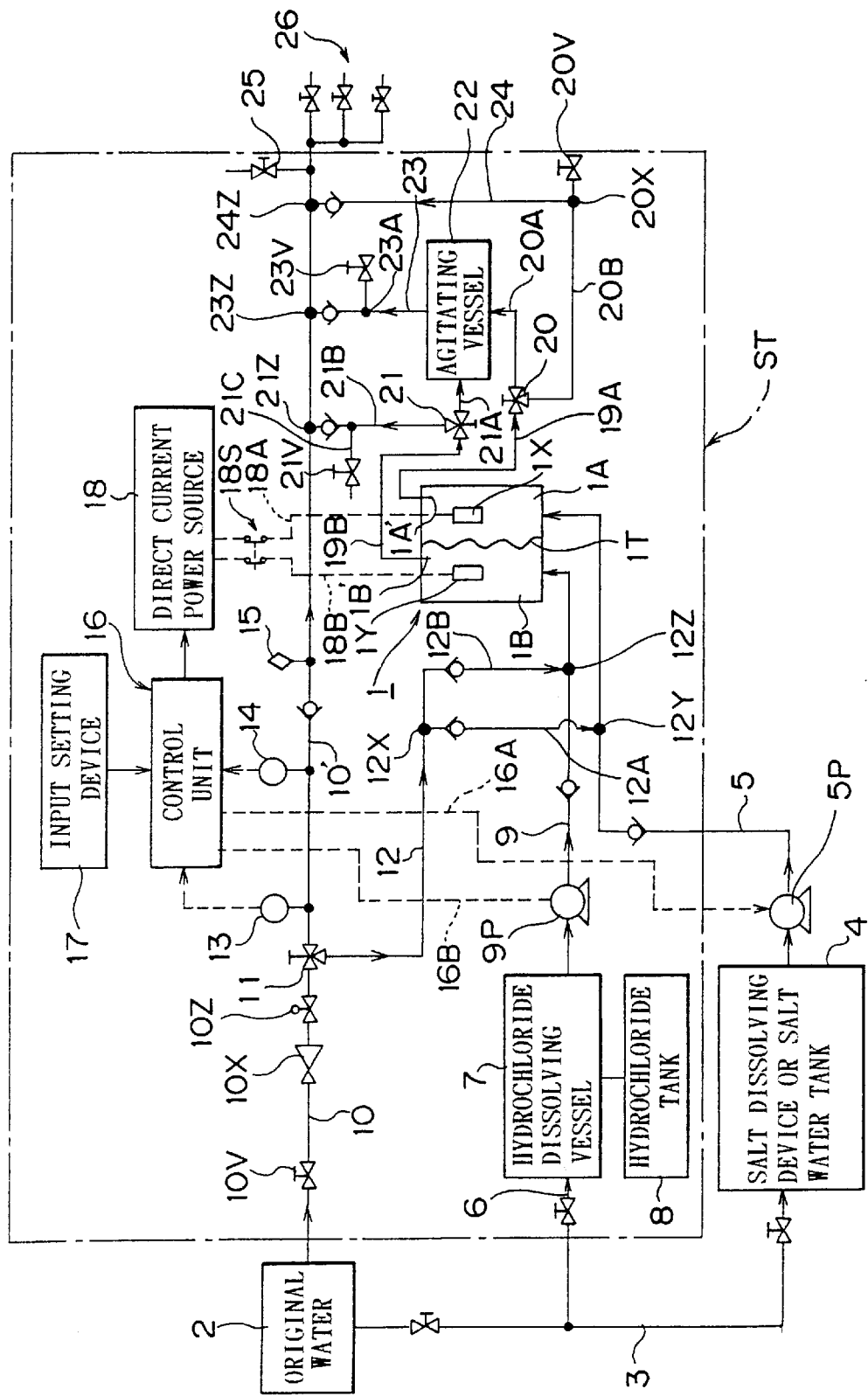
FIG. 1 is a diagram for explaining an overall construction of an apparatus for producing an electrolytic water according to the present invention.

One embodiment of an apparatus for producing an electrolytic water according to the present invention will now be described with reference to the accompanying drawings. FIG. 1 is a diagram for explaining an overall construction of the present invention. In the Figure, reference symbol ST denotes an apparatus for producing an electrolytic water; 1, an electrolysis vessel; 1T, a membrane (ion converting membrane) for partitioning the interior of the electrolysis vessel 1 into an anode chamber 1A and a cathode chamber 1B; 1X and 1Y, electrodes disposed within the anode chamber 1A and the cathode chamber 1B, respectively. The electrodes 1X, 1Y are connected to a direct current power source 18 through wiring 18A, 18B and a power switch 18S.

Again in FIG. 1, reference numeral 2 denotes a raw water supply source for supplying service water or the like and reference numeral 4 denotes a salt water dissolving device or a salt water tank connected to the raw water supply source 2 through a water supply tube 3. A sodium chloride solution or a potassium chloride made to have a constant concentration within the salt water dissolving device or the salt water tank 4 is delivered by a water supply pump 5P to the anode chamber 1A through a water supply tube 5 and finally electrolyzed in that chamber. The water supply pump 5P is designed such that the water supplied from the pump 5P can be adjusted in quantity.

Similarly, reference numeral 7 denotes a hydrochloride dissolving vessel connected to the raw water supply source 2 through a water supply tube 6, and reference numeral 8 denotes a hydrochloride tank for supplying a hydrochloride to the vessel 7. A hydrochloride solution or a dilute hydrochloride solution made to have a constant concentration within the hydrochloride vessel 7 is delivered, by a water supply pump 9P, to the cathode chamber 1B through a supply tube 9 and finally electrolyzed in that chamber.

Similarly, reference numeral 10 denotes a raw water supply tube connected to the raw water supply source 2; 10V, 10X, 10Z, a prime plug, a pressure reducing valve, a solenoid valve (safety device) set on a mid-way of the raw water supply tube 10; and 11, a three-way switch valve, respectively. One and the other side of the three-way switch valve 11 are connected with a raw water supply main tube 10' and a branch tube 12, respectively. The branch tube 12 is bifurcated at a bifurcating portion 12X on its distal end into two bifurcating tubes 12A, 12B. Distal ends of the bifurcating tubes 12A, 12B are connected to charging portions 12Y, 12Z disposed at midways of the supply tubes 5, 9, respectively, so that raw water can be delivered for washing to the anode chamber 1A and the cathode chamber 1B only when that is required.

Reference numeral 13, 14 denote a flow quantity sensor and a pressure sensor set to a mid-way of the raw water supply main tube 10'; 15, a safety valve; and 16, a control unit with an arithmetic calculation function, respectively. The control unit 16 is adapted to control the water supply pumps 5P, 9P through communication lines 16A, 16B based on setting data inputted from an input setting device 17, so that the quantities of treating water (aqueous solution) to be supplied to the anode chamber 1A and the cathode chamber 1B is increased/decreased, a power switch 18S for the direct current power source 18 is turned on/off in response to signal coming from the pressure sensor 14, and the used quantities and the remaining quantities of various treating solutions (sodium chloride, potassium chloride, hydrochloride) are calculated from the quantity of electrolytic production water which is to be mixed at a constant ratio with the raw water measured by the direct current sensor 18 based on the integrated flow quantity of the raw water. This control unit 16 includes a micro computer which will be described in detail later.

Reference numeral 1A', 1B' denote discharge ports for discharging electrolytic production water (namely, anodic water and cathodic water) produced in the anode chamber 1A and in the cathode chamber 1B; 19A, 19B, discharge tubes connected to the discharge portions 1A', 1B'; and 20, 21, three-way switch valves connected to distal ends of the discharge tubes 19A, 19B, respectively. One of the switch valves 20, 21 is connected to an agitating vessel 22 through a connecting tube 20A (or 21A). The remaining switch valve 20 (or 21) is connected to a water supply tube 20B (or 21B). The water supply tube 20B for the anode chamber 1A is bifurcated into two at its bifurcating portion 20X. One of the bifurcated portions of the water supply tube 20B is attached with a cock 20V and the other is connected, through a branch tube 24Z, to a dilute mixing portion 24Z disposed at a midway of the raw water supply main tube 10', so that the anodic water produced in the anode chamber 1A can be taken out independently by opening the cock 20V. When the cock 20V is not open, the anodic water can be dilute mixed with the raw water flowing through the raw water supply main tube 10'.

The water supply tube 21B for the cathode chamber 1B is bifurcate connected at its mid-way with a cock 21V for independently taking out the cathodic water produced in the cathode chamber 1B and at its distal end portion with a dilute mixing portion 21Z disposed on a mid-way of the raw water supply main tube 10', so that the cathodic water produced in the cathode chamber 1B can be dilute mixed with the raw water.

Reference numeral 23 denotes a water supply tube for connecting the agitating vessel 22 and a dilute mixing portion 23Z disposed on a mid-way of the raw water supply main tube 10', wherein a mixed water of the anodic water and the cathodic water which is agitated for mixture in the agitating vessel 22 can be dilute mixed with the raw water. This also makes it possible to independently take out the mixed production water by opening the cock 23V of the bifurcated tube 23A bifurcated at the mid-way of the water supply tube 23A.

In the illustration, reference numeral 26 denotes cocks attached to a distal end portion of the raw water supply main tube 10' and adapted to take out a production water therethrough, and reference numeral 25 denotes a drain valve. Through the an electrolytic production water obtained by dilute mixing a mixed water of anodic water and cathodic water to raw water, or an electrolytic production water obtained by dilute mixing only anodic water to raw water, or an electrolytic production water obtained by dilute mixing only cathodic water to raw water can selectively be obtained by switching the three-way switch valves 20, 21.

Figure 2:
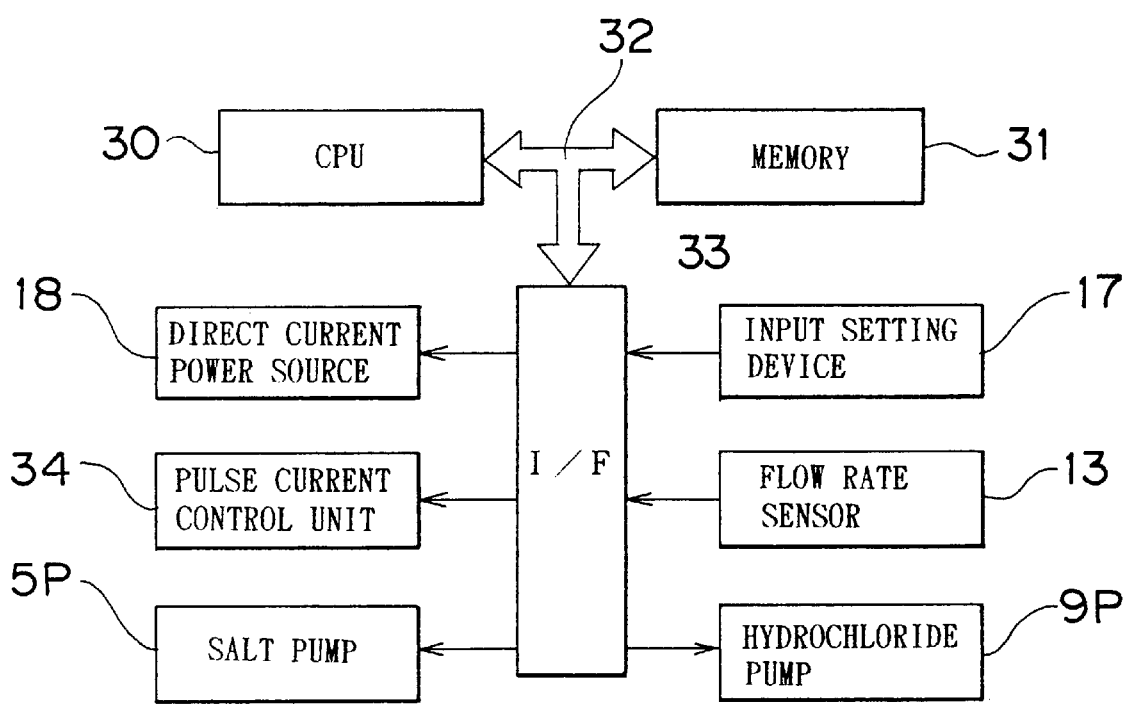
FIG. 2 is a block diagram for explaining an electrical construction of a control unit constituting the present invention.

FIG. 2 is a block diagram showing an electrical construction of the control unit 16 including a micro computer. In this Figure, reference numeral 30 denotes a CPU; 31, a memory for storing therein a system program and setting data, and 32, an interface circuit connected between the CPU 30 and the memory 32 through a bus 32, respectively. The interface circuit 33 is connected with the pumps 5P, 9P for supplying the electrolytes, the input setting device 17 for inputting the required concentration of effective chlorine and pH value, the direct current power source 18 including the electrodes 1X, 1Y and the power switch 18S, and a pulse current control unit 34 for supplying a pulse current at a predetermined ON/OFF duty ratio in accordance with instructions from the CPU 30. The pulse current control unit 34 makes a controlling operation in accordance with the program stored in the memory 31, under the supervision of the CPU 30.

In accordance with the instructions of the CPU 30, the control unit 16 controls the water supply pump 5P for the anode chamber 1A and the water supply pump 9P for the cathode chamber 1B, so that the quantity of treating water to be supplied to the anode chamber 1A and the cathode chamber 1B can be increased/decreased. In case the quantity of water supplied to the anode chamber 1A is increased, the pulse current control unit 34 is controlled to increase the ON-time ratio of the electrodes 1X, 1Y proportionally, and in case the quantity of water supplied to the anode chamber 1A is decreased, the ON-time ratio is decreased proportionally, so that there can be produced an electrolytic production water having a constant concentration of effective chlorine as set, irrespective of the quantity of the electrolytic production water (anodic water) discharged from the anode chamber 1A.

In addition, since the data related to the quantity of treating water (hydrochloride or dilute hydrochloride) to be supplied to the cathode chamber 1B when a predetermined flow quantity of production water (sterilizing water) having the concentrations of effective chlorine is to be produced and the pH value which the resultant production water shows, are preliminarily stored, a production water having a constant quality can normally be supplied merely by input setting the concentration of effective chlorine and pH value through the input setting device 17, irrespective of opening degree of the prime plug 10V, the, etc.

Figure 3:
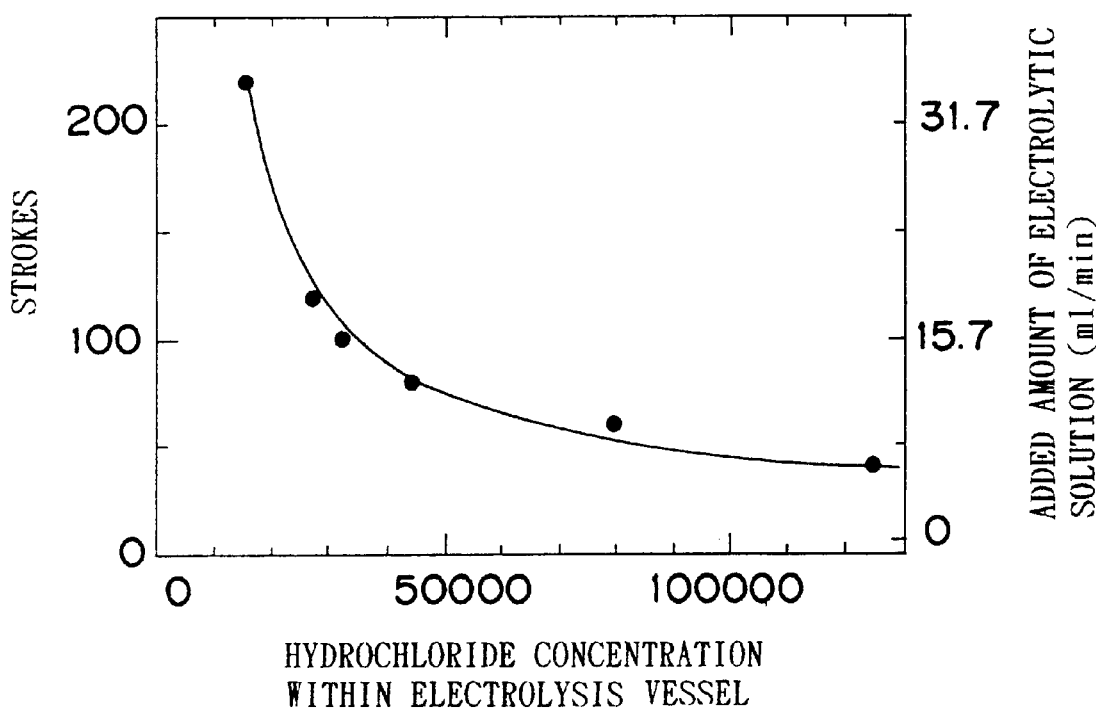
FIG. 3 is a graph showing a relation between strokes of a pump at the time of a constant current and a quantity of hydrochloride produced in an electrolysis vessel.
Figure 4:
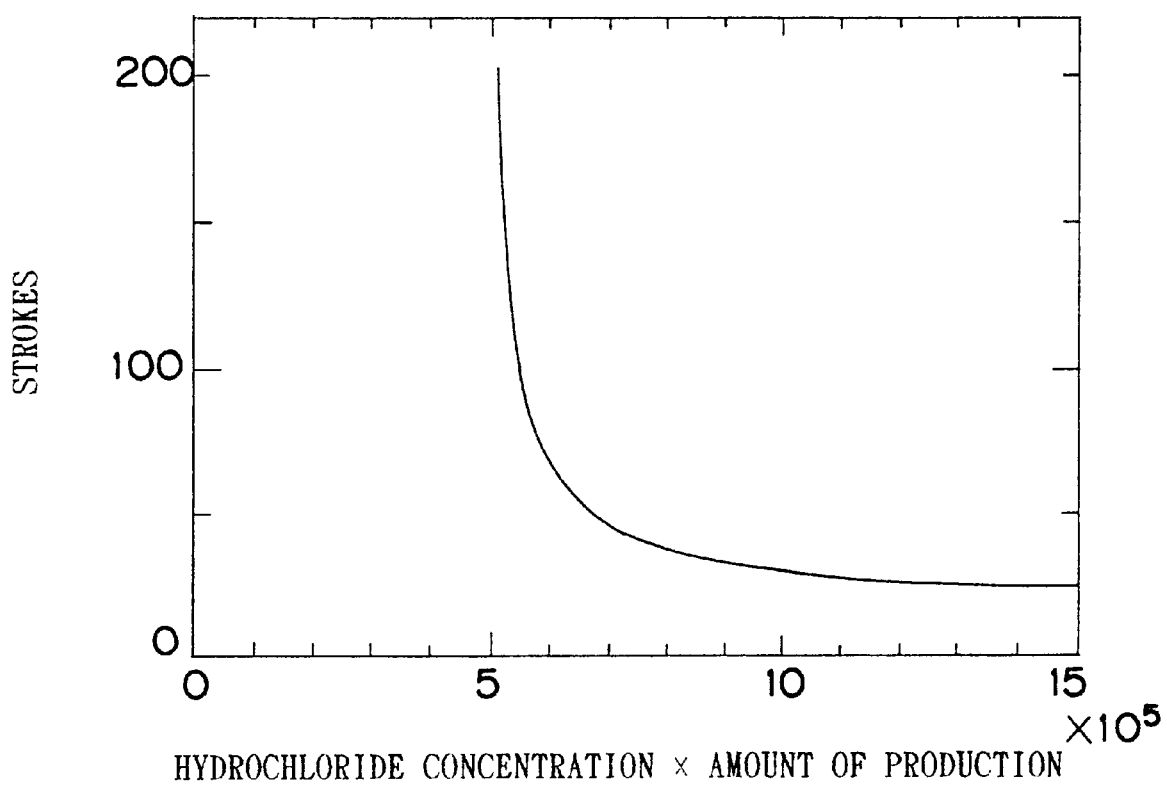
FIG. 4 is a graph showing a relation between a quantity of effective hydrochloride produced per unit time within an anode chamber and strokes of a pump.
Figure 5:
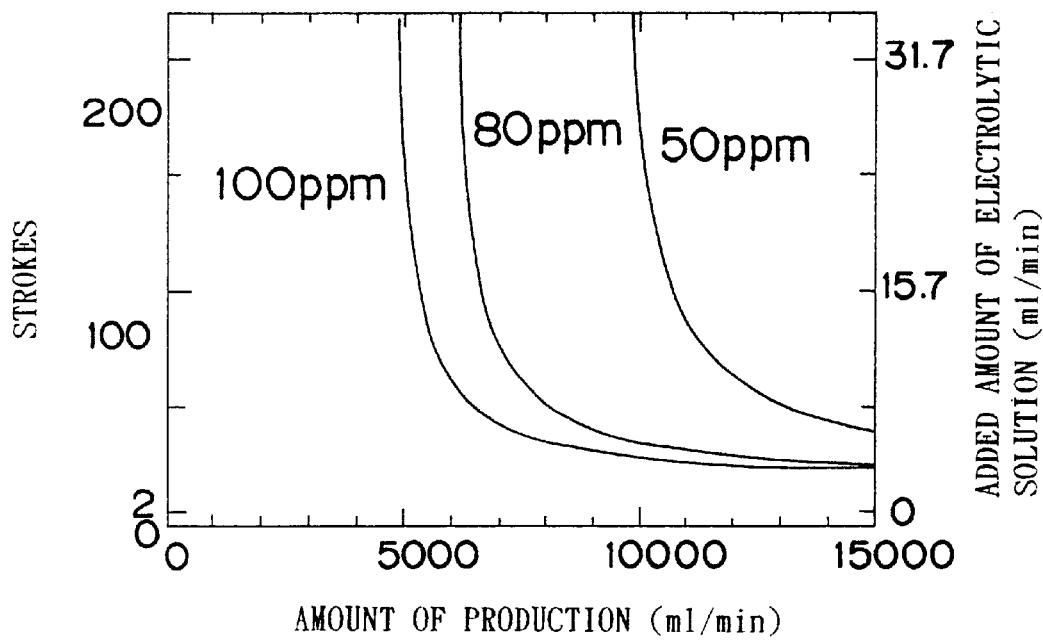
FIG. 5 is a graph showing a relation between a quantity of production water obtained from a cock when pH is constant and strokes of a pump.

FIG. 3 is a graph showing a relation between the strokes (adding quantity per unit time) of the pump 5P at the time of a constant electric current, and the quantity of chlorine produced in the anode chamber 1A, FIG. 4 is a graph showing a relation between the quantity of effective chlorine generated in the anode chamber 1A per unit time and the strokes of the pump 5P, and FIG. 5 is a graph showing a relation between the quantity of production water taken out through the cock 26 when the pH is constant, and the strokes of the pump 5P. It is known from those graphs that if the adding quantity of the electrolyte is increased by increasing the strokes of the pump 5P, the concentration of effective chlorine and the quantity of effective chlorine per unit time, and the quantity of production water taken out through the cock 26 per unit time are decreased, and if the strokes are decreased to decrease the supply quantity of electrolyte, they are all increased.

Also, the supply quantity of sodium chloride or potassium chloride (i.e., strokes of the pump 5P) with respect to the flow quantity of raw water can be divided out based on the relation shown in the graph of FIG. 4.

Figure 6:
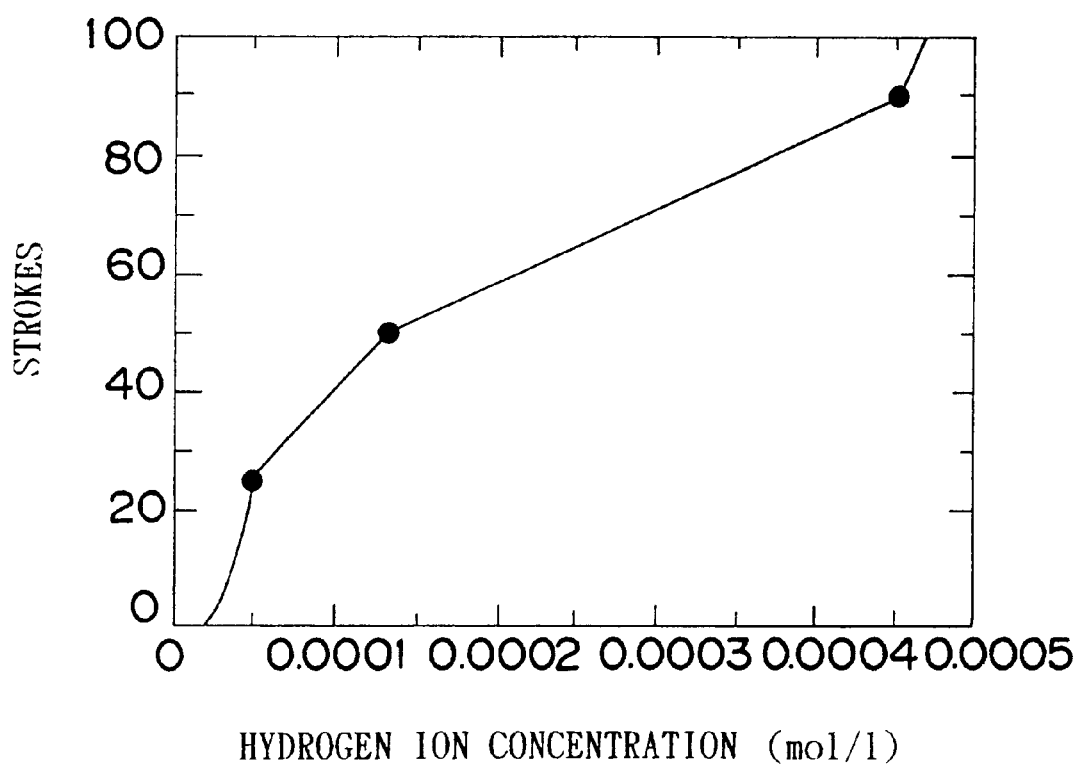
FIG. 6 is a graph showing a relation between concentration of hydrogen ion produced within a cathode chamber and strokes of a pump.
Figure 7:
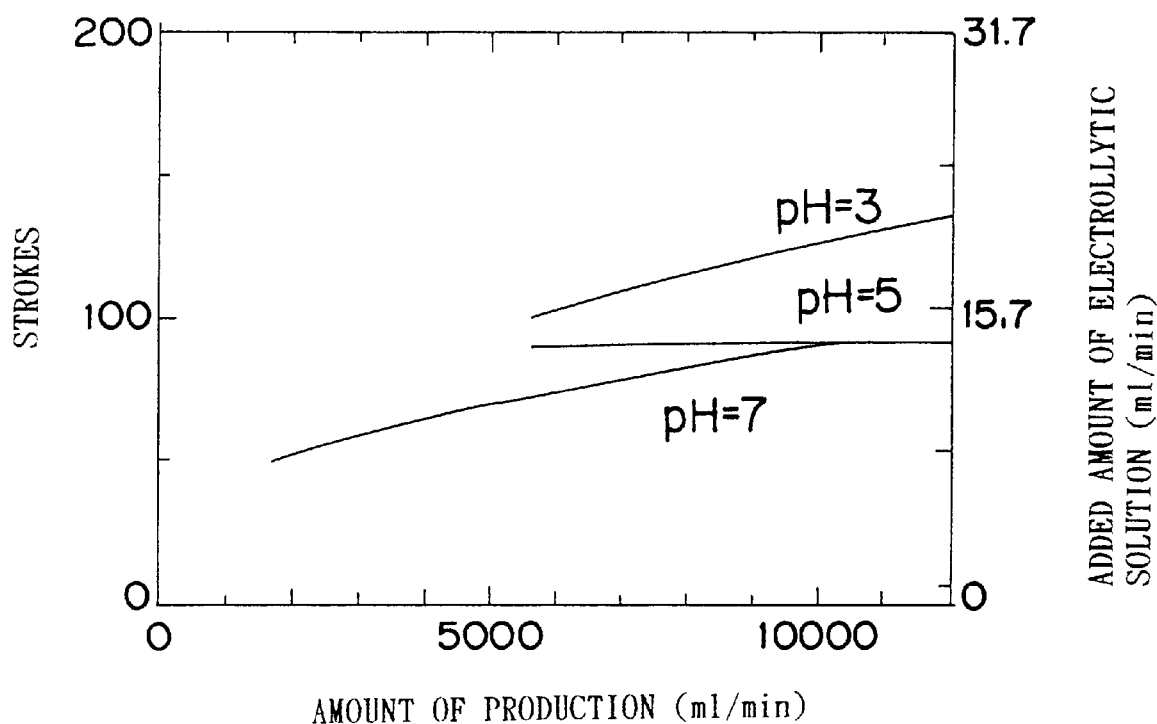
FIG. 7 is a graph showing a relation between a quantity of production water for various pH obtained from a cock when the concentration of effective hydrochloride is constant and strokes (quantity to be added per unit time) of a pump.

FIG. 6 is a graph showing a relation between the concentration of hydrogen ion to be generated in the cathode chamber 1B and the strokes (adding quantity per unit time) of the pump 9P, and FIG. 7 is a graph showing a relation between the quantities of production water in various pH taken out through the cock 26 when the concentration of effective chlorine is constant, and the strokes (adding quantity per unit time) of the pump 9P. The supply quantity of hydrochloride corresponding to the flow quantity can be properly controlled based on this relation.

Figure 8:
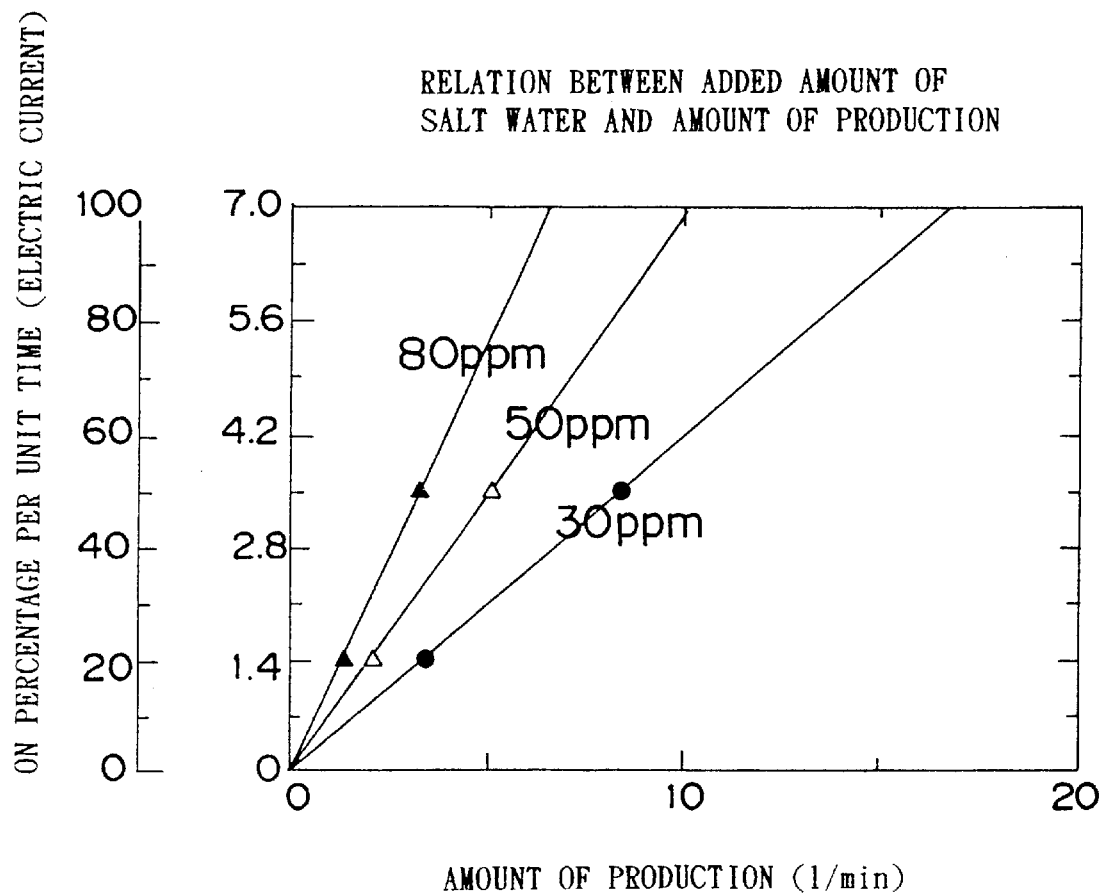
FIG. 8 is a graph showing a relation among a quantity of salt to be added, percentage per unit time for turning on an electrode, and a production quantity.

FIG. 8 is a graph showing a relation between the adding quantity of sodium chloride solution to be supplied to the anode chamber 1A by the pump 5P and the various concentrations (30 ppm, 50 ppm, 80 ppm) of effective chlorine when the ON-time percentages per unit time for the electrodes 1X, 1Y are plotted on the vertical axis and the quantity of production water discharged through the cock 26 is plotted on the horizontal axis. It is known from this Figure that by pulse electrolysis, the quantities of production water having various concentrations of effective chlorine are in proportional corresponding relation to the adding quantity of salt water.

Figure 9:
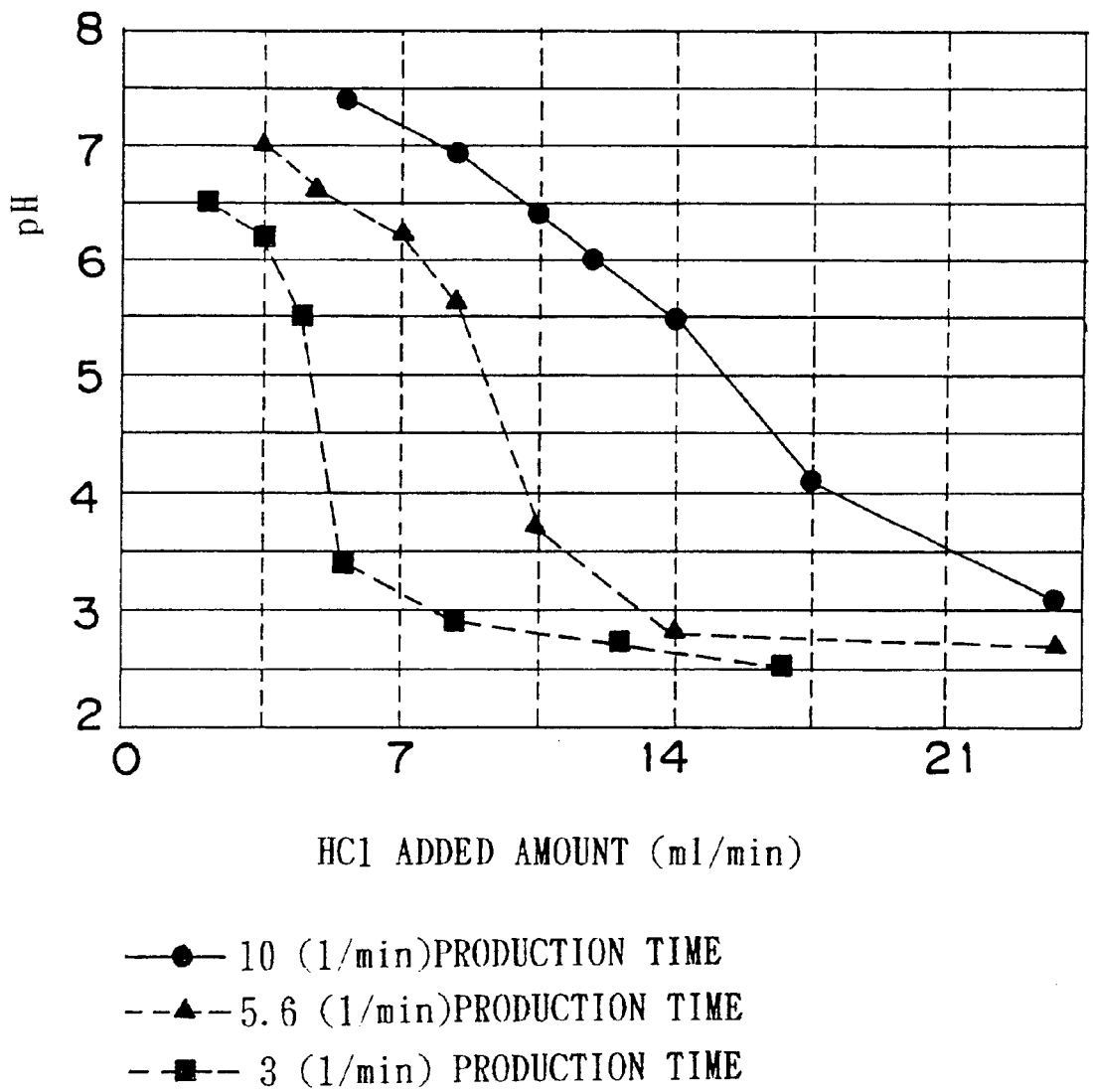
FIG. 9 is a graph showing a relation between a quantity of hydrochloride to be added at the time of 50 ppm and pH.

FIG. 9 is a graph plotting the adding quantity of hydrochloride (HCl) when the hydrochloride is supplied to the cathode chamber 1B by the pump 9P in the state that a pulse electrolysis is undergoing in order to produce a production water having the concentration 50 ppm of effective chlorine shown in FIG. 8, and the variation of pH of the production water discharged through the cock 9P.

Figure 10:
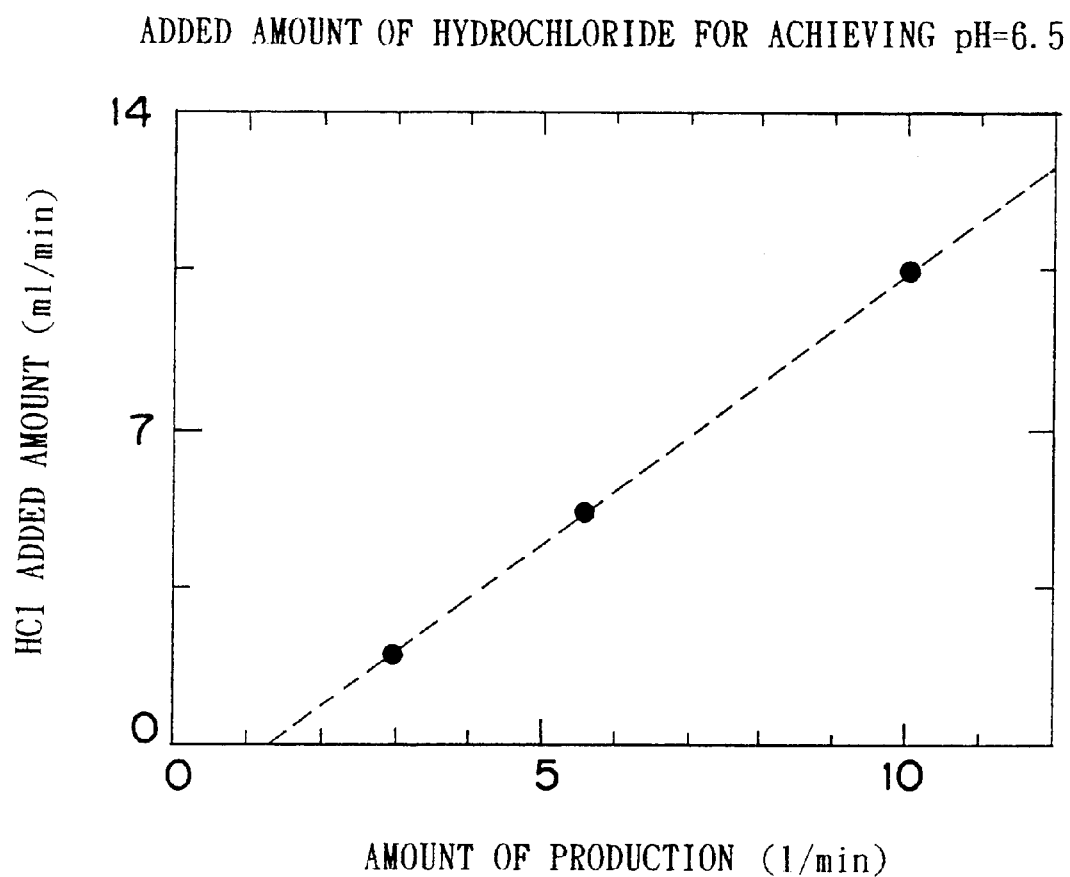
FIG. 10 is a graph showing a relation between a quantity of hydrochloride at the time of 50 ppm for adjustment to pH6.5 and a production quantity.

FIG. 10 is a graph showing a relation between the adding quantity of hydrochloride (HCl) when a production water having the concentration 50 ppm of effective chlorine and pH6.5 is to be produced, and the quantity of production water. For adjusting the pH of production water discharged through the cock 26 to 6.5, the values of the crossing points between the pH 6.5 and the 10 (1/min) production time, 5.6 (1/min) production time and 3 (1/min) production time shown in the graph of FIG. 9 are plotted on the vertical axis and the various quantities of production are plotted on the horizontal axis, thereby the adding quantity of hydrochloride can be obtained for each production quantity. It is known from this illustration that the quantity of production water discharged through the cock 26 and the adding quantity of hydrochloride to be supplied to the cathode chamber 1B are in proportional relation.

Figure 11:
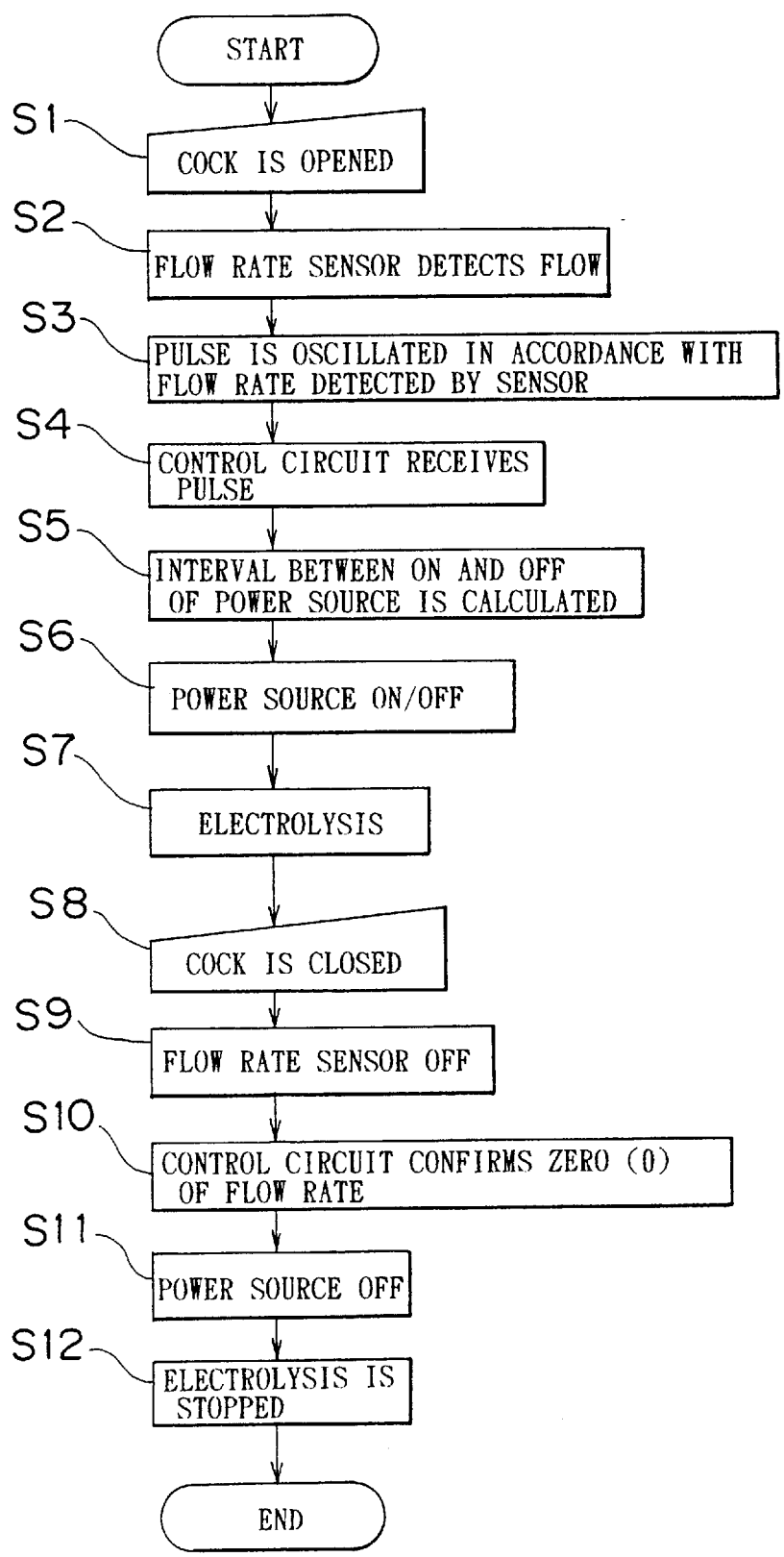
FIG. 11 is a flowchart for explaining a procedure of the present invention.

The procedure for producing an electrolytic water according to the present invention will now be described with reference to the flowchart of FIG. 11. First in step S1, when the prime plug 10V of the raw water supply tube 10 is opened, the flow quantity sensor 13 detects the flow of raw water in step S2. The process then proceeds to step S3 where the flow quantity sensor 13 oscillates a pulse signal corresponding to the flow quantity and the process then proceeds to step S4.

In step S4, when the control unit 16 receives the pulse signal, the process proceed to step S5 where the ON/OFF interval for the power switch 18S is calculated. Based on the calculated data, the pulse current control unit 34 supplies a pulse current at a predetermined ON/OFF duty ratio so as to ON/OFF control the power switch 18S at a predetermined ratio in step S6.

Then, in step S7, based on the ON/OFF operation of the power switch 18S, the electrodes 1X, 1Y are ON/OFF controlled to produce an electrolytic water having a predetermined concentration of effective chlorine and pH. By changing the setting value, an electrolytic water having a different concentration of effective chlorine and pH can be produced as mentioned above.

Then, when the prime plug 10V is closed in step S8, the process proceeds to step S9 where the flow quantity sensor 13 is turned off. Subsequently, the process proceeds to step S10 where when the control unit 16 confirms that the flow quantity is zero, the process then proceeds to step S11 where the power switch 18S is turned off. Then, in step S12, the electrolytic operation is stopped to finish the procedure.

Since the apparatus for producing an electrolytic water according to the present invention is constructed in the manner as described hereinbefore, the pumps, 5P, 9P are actuated to supply an aqueous solution of sodium chloride or potassium chloride having a constant concentration to the anode chamber 1A and an aqueous solution of hydrochloride or dilute hydrochloride having a constant concentration to the cathode chamber 1B so as to be subjected to electrolytic treatment, and on the other hand, the control unit 16 is actuated to control the quantities of respective electrolytes to be supplied to the anode chamber 1A and the cathode chamber 1B, thereby there can be produced an anodic water having a low pH within a range of from, for example, 0.5 to 7 and a high concentration of chlorine within a range of from, for example, 50000 to 0 ppm in the anode chamber 1A and a cathodic water having a pH within a range of from, for example, 13.5 to 0.5 and a concentration of effective chlorine within a range of from, for example, 0 to 300 ppm in the cathode chamber 1B.

Then, by mixing the anodic water and the cathodic water together, there can easily be produced an electrolytic production water having a pH within a range of from, for example, 13.5 to 0.5 and a concentration of effective chlorine within a range of from, for example, 0 to 50000 ppm. Accordingly, the pH and the concentration of effective chlorine can easily and independently be controlled. Since the concentration of effective chlorine of, for example, 50000 ppm can be diluted to, for example, 30 to 80 ppm, any requirement can be met satisfactorily irrespective of the used quantity.

As is apparent from the foregoing, according to the apparatus for producing an electrolytic water of the present invention, a required quantity of electrolytic production water can be produced by a single apparatus only when it is required. Accordingly, it is no longer required, unlike in the prior art, to preliminarily store a required electrolytic production water in a preliminarily prepared tank or the like, or to install a separate apparatus. Thus, the present invention is convenient in respect of use and economic efficiency.

Moreover, since an aqueous solution of sodium chloride or potassium chloride having a predetermined concentration and an aqueous solution of hydrochloride and dilute hydrochloride as a treating electrolyte, the constituents are stable. This makes it possible to eliminate the problem that electrolytic reaction is irregular due to differences in the synthetic constituents of service water (raw water) in one district from others, for example. As a consequence, there can easily be obtained an electrolytic production water having a stable electrolysis, a constant effective concentration, and pH.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for producing an electrolytic water, said apparatus comprising:

(a) an electrolyzing vessel comprising an anode chamber, a cathode chamber, and a partition membrane, said partition membrane being disposed between said anode chamber and said cathode chamber, wherein electric current which is supplied to electrodes disposed in said anode and cathode chambers, and water to be electrolyzed which is delivered into said anode and cathode chambers to produce anodic water in said anode chamber, and cathodic water in said cathode chamber, produce electrolytic water which is discharged through discharge ports disposed on said anode and cathode chambers;

(b) anode side treating water supply means for (i) supplying as treating water. sodium chloride solution or potassium chloride solution to said anode chamber and (ii) adjusting quantities of supply of said sodium chloride solution or potassium chloride solution, said anode chamber being connected with said anode side treating water supply means;

(c) cathode side treating water supply means for supplying, as treating water, hydrochloride solution or dilute hydrochloride solution to said cathode chamber, said cathode chamber being connected with said cathode side treating water supply means; and (d) a raw water supply passage for supplying service water, said raw water supply passage being provided with a flow meter for detecting a flow quantity of said raw water, wherein said anode side treating water supply means and said cathode side treating water supply means comprise an anode side pump and a cathode side pump, respectively, and each of said anode side pump and said cathode side pump is controlled for operation in accordance with said flow quantity of raw water measured by said flow meter, so that a required quantity of produced anodic water, cathodic water, or mixed water thereof, can be mixed with said raw water.

2. An apparatus for producing an electrolytic water according to claim 1, further comprising electrolytic water producing/mixing means capable of mixing, at a desired ratio, anodic water produced in said anode chamber and discharged therefrom, with cathodic water produced in said cathode chamber and discharged therefrom, so as to obtain mixed water.

3. An apparatus for producing an electrolytic water according to claim 1, further comprising dilute mixing means capable of mixing, at a desired ratio, anodic water produced in said anode chamber, cathodic water produced in said cathode chamber, or mixed water comprising said anodic water and said cathodic water, with raw water such as service water, so as to obtain mixed water.

4. An apparatus for producing an electrolytic water according to claim 3, further comprising solution-to-beelectrolyzed used/remaining quantity arithmetic calculation means capable of calculating and outputting a remaining quantity of a used quantity, and a remaining quantity of solution-to-be-electrolyzed which remaining quantity is obtained by calculation based thereon, in accordance with an integrated flow quantity of said raw water measured by said flow meter.

5. An apparatus for producing an electrolytic water according to claim 1, said apparatus further comprising electrolytic current control means for controlling supply quantities of electric current with respect to the electrodes of said anode chamber and said cathode chamber such that in case a supply quantity of the treating water with respect to said anode chamber is to be increased, the supply quantity of the electric current is increased in proportion to said increase of the supply quantity of the treating water, and in case a supply quantity of the treating water with respect to said anode chamber is to be decreased, the supply quantity of the electric current is decreased in proportion to said decrease of the supply quantity of the treating water.

6. An apparatus for producing an electrolytic water according to claim 5, further comprising means for adjusting independently from said anode side the quantity of the treating water supplied by said cathode side treating water supply means.

7. An apparatus for producing an electrolytic water according to claim 5, further comprising storage means for storing, when a predetermined flow quantity of electrolytic production water having various effective hydrochloride concentration is to be produced, data related to a quantity of said treating water supplied to said cathode chamber side and a pH value which characterizes the resultant electrolytic production water, and cathode chamber side supply quantity control means for determining a supply quantity of said treating water with respect to said cathode chamber based on various pH values which are set based on the related data stored in said storage means, and a flow value which is obtained based on a relation between the quantity of treating water to be supplied to said cathode chamber side for each effective hydrochloride concentration, and controlling said cathode side treating water supply means based on the supply quantity thus determined, so that a constant quantity of treating water is supplied.

8. An apparatus for producing an electrolytic water according to claim 1, said apparatus further comprising electrolytic current control means for controlling variable ON/OFF duty ratio of pulse current supplied to the electrodes of said anode and cathode chambers, such that in case a supply quantity of the treating water with respect to said anode chamber is to be increased, the ON-time duty ratio is increased in proportion to said increase of the supply quantity of the treating water, and in case a supply quantity of the treating water with respect to said aiode chamber is to be decreased, the ON-time duty ratio is decreased in proportion to said decrease of the supply quantity of the treating water.

9. An apparatus for producing an electrolytic water according to claim 8, further comprising, means for adjusting independently from said anode side the quantity of the treating water supplied by said cathiode side treating water supply means.

10. An apparatus for producing an electrolytic water according to claim 8, further comprising storage means for storing, when a predetermined flow quantity of electrolytic production water having various effective hydrochloride concentration is to be produced, data related to a quantity of said treating water supplied to said cathode chamber side and a pH value which characterizes the resultant electrolytic production water and cathode chamber side supply quantity control means for determining supply quantity of said treating water with respect to said cathode chamber based on various pH values which are set based on the related data stored in said storage means and a flow value which is obtained based on a relation between the quantity of treating water to be supplied to said cathode chamber side for each effective hydrochloride concentration, and controlling said cathode side treating water supply means based on the supply quantity thus determined, so that a constant quantity of treating water is supplied.

* * * * *